United States Patent [19]

Shavit

[11] 4,110,827
[45] Aug. 29, 1978

[54] LOAD CYCLING WITH SPACE TEMPERATURE FEEDBACK

[75] Inventor: Gideon Shavit, Highland Park, Ill.

[73] Assignee: Honeywell Inc., Minneapolis, Minn.

[21] Appl. No.: 737,621

[22] Filed: Oct. 29, 1976

[51] Int. Cl.[2] ............... F24F 3/00; G05B 11/32; G05D 23/19; G06F 15/20

[52] U.S. Cl. ................. 364/550; 364/557; 165/22

[58] Field of Search .............. 235/151.3, 151, 151.1; 165/22, 14; 219/486; 364/492, 493, 418, 550, 557

[56] References Cited

U.S. PATENT DOCUMENTS

| 2,179,044 | 11/1939 | Kriechbaum | 236/91 |
|---|---|---|---|
| 2,216,825 | 10/1940 | Miller | 236/46 |
| 2,789,197 | 4/1957 | Boehm | 219/20 |
| 3,096,937 | 7/1963 | Steiner | 236/78 |
| 3,400,374 | 9/1968 | Schumann | 235/151.1 X |
| 3,496,337 | 2/1970 | Voglesonger | 219/486 |
| 3,551,646 | 12/1970 | Harmon | 219/485 |
| 3,767,894 | 10/1973 | Berger | 219/321 |
| 3,896,871 | 7/1975 | Pecoraro et al. | 235/151.1 X |
| 3,901,308 | 8/1975 | Berger | 165/2 |
| 3,906,242 | 9/1975 | Stevenson | 307/38 |
| 3,933,197 | 1/1976 | Zimmer et al. | 165/22 X |
| 4,013,118 | 3/1977 | Zimmer et al. | 165/22 |

*Primary Examiner*—Edward J. Wise
*Attorney, Agent, or Firm*—Trevor E. Joike

[57] ABSTRACT

A system for cycling loads within a building to save energy is disclosed having a control apparatus for cycling the loads on and off according to a predetermined cycle rate, each load having an on time and off time within a cycle and wherein the control apparatus is responsive to a temperature sensor located within the building for resetting the off time of the load during each cycle.

24 Claims, 9 Drawing Figures

DUTY CYCLE CONTROL SCHEDULE

| | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|
| 0 | E | NO. DAYS 0-27 | | | NO. PERIODS 0-15 | | | | A | NO. OF WORDS 8-85 | | | | | | | |
| 1 | CYCLE RATE 1 | | | | | | | | CYCLE RATE 2 | | | | | | | | |
| 2 | WORK SPACE | | | | | | | | | | | | | | | | |
| 3 | WORK SPACE | | | | | | | | | | | | | | | | |
| 4 | NEXT CYCLE TIME | | | | | | | | OPEN | | | | B | CONTR. 0-3 | | | |
| 5 | PER 1 | | PER 2 | | PER 3 | | PER 4 | | PER 5 | | PER 6 | | PER 7 | | PER 8 | | |
| 6 | PER 9 | | PER 10 | | PER 11 | | PER 12 | | PER 13 | | PER 14 | | PER 15 | | PER 16 | | |
| 7 | START TIME PERIOD | | | | | | | 1 | START TIME PERIOD | | | | | | | 2 | |
| 8 | | | | | | | | 3 | | | | | | | | 4 | |
| 9 | | | | | | | | 5 | | | | | | | | 6 | |
| 10 | | | | | | | | 7 | | | | | | | | 8 | DAY 0 |
| 11 | | | | | | | | 9 | | | | | | | | 10 | |
| 12 | | | | | | | | 11 | | | | | | | | 12 | |
| 13 | | | | | | | | 13 | | | | | | | | 14 | |
| 14 | | | | | | | | 15 | | | | | | | | 16 | |
| 15 | PER 1 | | PER 2 | | PER 3 | | PER 4 | | PER 5 | | PER 6 | | PER 7 | | PER 8 | | |
| 16 | PER 9 | | PER 10 | | PER 11 | | PER 12 | | PER 13 | | PER 14 | | PER 15 | | PER 16 | | |
| | START TIME PERIOD | | | | | | | 1 | START TIME PERIOD | | | | | | | 2 | DAY 1 |

A = 1 = FIRST PERIOD START / STOP PROGRAM
B = 1 = SCHEDULE IS ACTIVE

FIG. 3

DUTY CYCLE TABLE

| | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| FIXED DATA FILE | 0 | E | | across | POINT WAITING TO BE CONTROLLED | | | | | | NO. OF POINTS (1 – 99) | | | | | | |
| | 1 | CALCULATION GROUP | | | | | | | | | | | | | | | A |
| | 2 | OUTSIDE AIR TEMPERATURE POINT | | | | | | | | | | | | | | | |
| | 3 | | MAX SPACE TEMPERATURE | | | | | | | MIN SPACE TEMPERATURE | | | | | | | |
| | 4 | OPEN | | | | | | | | CHANGEOVER TEMPERATURE | | | | | | | |
| FIRST POINT | 5 | S/S CHANNEL / GROUP | | | | | | | | POINT NO. | | | | | | | B |
| | 6 | SPACE TEMPERATURE CHANNEL /GROUP | | | | | | | | POINT NO. | | | | | | | C |
| | 7 | S1 | S2 | MAX OFF TIME | | | | | | MIN OFF TIME | | | | | | | |
| | 8 | KW RATING | | | | | | | | DUTY CYCLE SCHEDULE | | | | | | | |
| | 9 | COUNTDOWN TO TURN OFF | | | | | | | | MINUTES TO BE OFF ($T_{OFF}$) | | | | | | | |
| SECOND POINT | 10 | S/S CHANNEL / GROUP | | | | | | | | POINT NO. | | | | | | | B |
| | 11 | SPACE TEMPERATURE CHANNEL /GROUP | | | | | | | | POINT NO. | | | | | | | C |
| | 12 | S1 | S2 | MAX OFF TIME | | | | | | MIN OFF TIME | | | | | | | |
| | 13 | KW RATING | | | | | | | | DUTY CYCLE SCHEDULE | | | | | | | |
| | 14 | COUNTDOWN TO TURN OFF | | | | | | | | MINUTES TO BE OFF ($T_{OFF}$) | | | | | | | |

A = 1 = DUTY CYCLE OVERRIDE FLAG

B = 1 = DENOTES INTERIOR POINT

C = 1 = USE $T_{OFF}$ = 0 IF OUT OF COMFORT RANGE

E = 1 = FILE ENABLED

S1 = 1 = SEND START COMMAND

S2 = 1 = SEND STOP COMMAND

IF NO SPACE TEMPERATURE IS ASSIGNED, THE MINUTES TO BE OFF ($T_{OFF}$) IS SET TO THE MINIMUM OFF TIME

FIG.4

LOAD CYCLING WITH SPACE TEMPERATURE FEEDBACK

BACKGROUND OF THE INVENTION

The invention relates to the cycling of loads within a building for saving energy.

In recent years, with the renewed, increased interest in energy conservation, and particularly as a result of increases in the cost of fuels and a concomitant decrease in their availability it has become desirable and economically responsible to operate the various loads within a building in an energy conserving manner. Such buildings may, for example, comprise a plurality of floors each floor having both exterior and interior offices, zones or spaces and each floor having at least one fan system with associated temperature controlling apparatus. It can readily be seen that by cycling the temperature controlling apparatus and fans in the fan system on and off instead of running them continuously as had been done in the prior art, a substantial amount of energy can be saved.

In the prior art, these temperature controlling apparatus and fans were cycled independently of the physical condition which may be, for example, temperature or humidity. Cycling these loads without feedback from the physical condition resulted in erractic control within the building. In an attempt to solve this erractic behavior, the prior art controlled the cycling of the loads within the buildings according to outdoor temperature. The use of an outdoor temperature sensor or other type of condition sensor, however, did not totally solve the problem because the indoor temperature or physical condition is effected by conditions other than the outdoor temperature.

In the present invention, the loads of the building are cycled at a predetermined rate and the off time within each cycle for each load or selected loads within the building is reset by a temperature sensor located within the building. This system not only compensates for the outdoor air temperature, but also compensates for the outdoor air which infiltrates into the building, the skin effect of the wind as it wipes over the building exterior surface and effects of solar radiation on the building. By resetting the off time according to indoor temperature or physical conditions, the physical condition within the building is controlled at a much more comfortable level.

Moreover, in load cycling systems of the past, particularly those which utilized computers for controlling the cycling of the loads within the building, information which was utilized by the computer was stored in memory on a point-by-point basis. By storing this information in this manner, a large amount of memory was used up for merely providing the design parameters to the program for use in controlling the cycling of the loads.

In the present invention, information relating to the time sequence of operation of the loads is stored within a schedule and the operating characteristics or design parameters of each load are stored within tables. A schedule may be applicable to several loads and certain of the information in a table can also relate to several of the loads. Thus, certain information can be stored in one location and still be applicable to several loads rather than having to store this information a plurality of times with respect to each of the loads within the building resulting in the saving of a large amount of storage space.

SUMMARY OF THE INVENTION

A control apparatus is provided including a physical condition or temperature responsive device, a control apparatus for cycling the loads within a building on and off according to a predetermined cycle rate, each load having an on time and off time within a cycle and wherein the control apparatus is connected to the physical condition or temperature responsive device located within the building for resetting the off time of the loads.

Moreover, a system for cycling loads is provided including a memory having a first group of storage locations for storing the schedules, each schedule containing information relating to a time sequence of operation for the loads, and the memory further having a second group of storage locations for storing the tables, each table containing information relating to the operational characteristics of each load covered by the table, and a processor or computer which is connected to the memory for using the information contained in the schedules and tables to cycle the loads within a building on and off according to a predetermined cycle rate, each load having an on time and an off time within a cycle, and wherein the off time of the loads is reset by a physical condition or temperature responsive device.

BRIEF DESCRIPTION OF THE DRAWINGS

These and other advantages and features will become apparent from a detailed review of the invention when taken in conjunction with the drawings in which;

FIG. 3 shows a schedule utilized for controlling the time sequence operation of the various loads within a building;

FIG. 4 shows a table which provides the operational characteristics of each of the controlled loads within a building;

DETAIL DESCRIPTION OF THE DRAWINGS

Figures 1, 2:
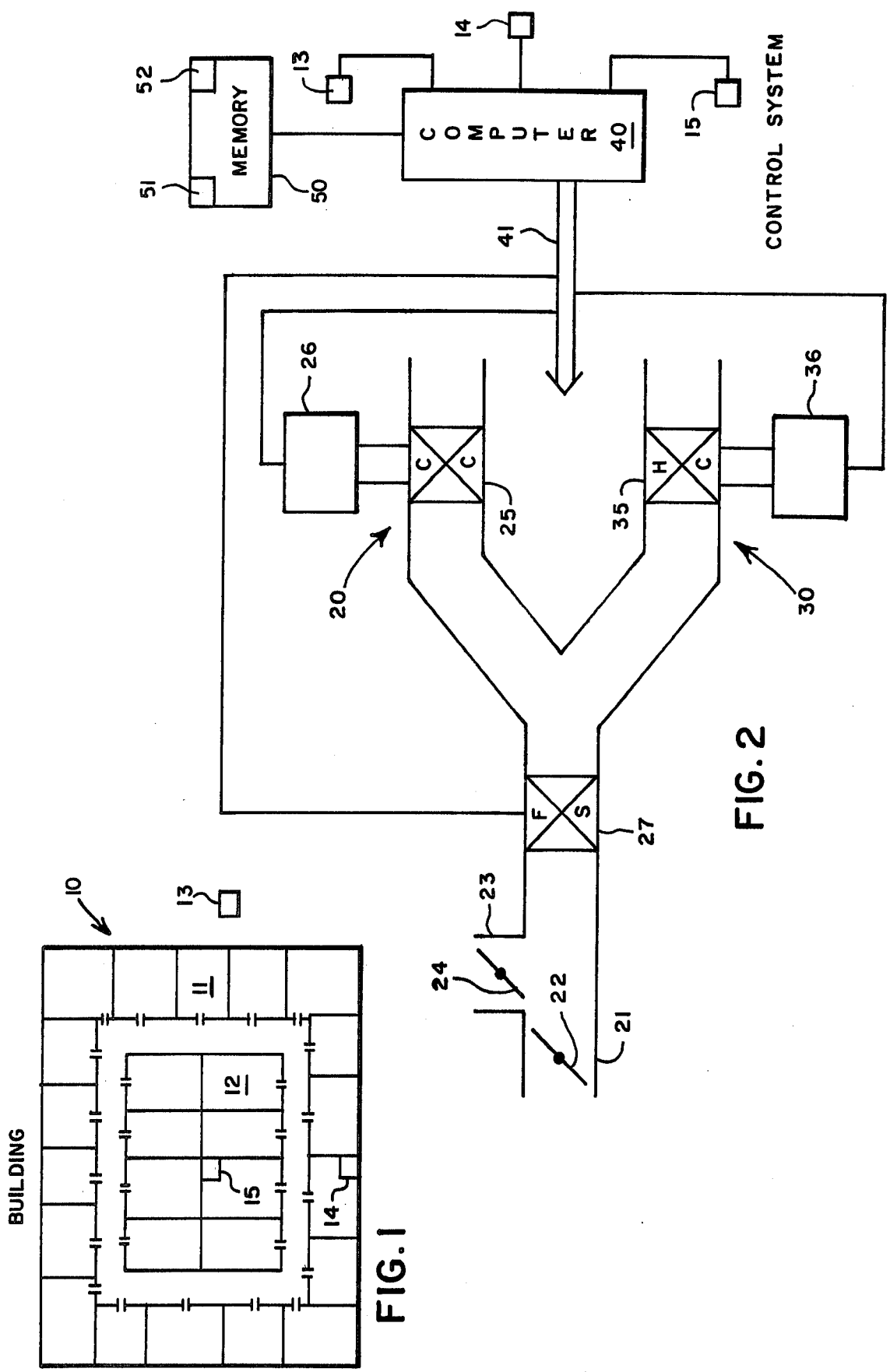
FIG. 1 is a layout of a typical floor of a building showing the interior and exterior zones and in which the present invention may be used.
FIG. 2 shows the typical fan and condition controlling system within a building, which system may be under the control of a computer.

FIG. 1 shows a floor plan of a typical building 10 which may comprise a plurality of floors. Each floor may consist of a plurality of exterior zones 11 and a plurality of interior zones 12. Located exterior to the building is an outdoor temperature sensor 13 and located within the building are a pair of temperature sensors or physical condition responsive sensors 14 and 15. In buildings which have both interior and exterior zones, the interior zones tend to be operated throughout the year during a summer mode of operation so that cooling is always provided to them. Thus, it may be necessary to provide the sensor 15 for solely controlling the interior zones. The exterior zones are operated in both summer and winter modes depending upon the time of year and, therefore, have a sensor 14 separate from the interior zone sensor 15. The exterior zones are more subject to outdoor conditions than are the interior zones. It may also be necessary to provide an exterior zone temperature sensor, such as sensor 14, for each side of the building since the temperature within the exterior zones on different sides of the building will vary during different times of the day dependent upon the position of the sun and wind direction. For the explanation of this invention, however, only one such exterior zone temperature sensor is shown.

For controlling the temperature of the interior and exterior zones of the floor of the building such as shown in FIG. 1, the double duct system as shown in FIG. 2 may be employed. This double duct system may comprise a cold deck 20 having an outdoor air duct 21 for bringing in outdoor air under the control of a damper 22 and a return air duct 23 for bringing back return air under the control of return air damper 24. The combination of the return air and the outdoor air is then passed through a fan 27 to cooling coil 25 in cold deck 20 which receives a heat exchange medium from a refrigeration unit or chiller 26. The air is then distributed to the various zones connected to the cold deck 20.

A hot deck 30 is provided connected to outdoor air duct 21 for bringing in outdoor air under the control of outdoor air damper 22 and a return air duct 23 for bringing back return air under the control of return air damper 24. This combined air is then supplied to heating coil 35 in hot air duct 30 by fan 27 which heating coil receives heat exchange fluid from a heating plant 36. The heated air is then distributed to the zones connected to the hot deck 30.

In the example shown in FIG. 1, the interior zones require cooling from the cold deck 20 and the exterior zones require heating from the hot deck 30 and cooling from the cold deck 20. Obviously, other types of air distribution systems can be utilized. Furthermore, if the building is a multistory building, each floor may have an air distribution system similar to that shown in FIG. 2. Furthermore, although one outdoor temperature sensor 13 is shown in FIG. 1, more than one outdoor temperature sensor may be provided. For example, if it is found that the outdoor temperature surrounding the building changes either around the building or along the height of the building, more than one outdoor temperature sensor can be provided.

In order to conserve energy, it is desirable to cycle the loads or some of the loads of the building. For example, the cooling plant 26, the heating plant 36 and the fan 27 may be cycled under the control of a computer 40 which is connected to memory 50 and which has inputs from the temperature sensors 13, 14 and 15. The computer is connected to the various loads over an output bus 41. The output bus 41 may be a coax cable or a buddle of output lines each controlling a particular load.

The computer 40 is programmed, the program appearing as an appendix to this application, for cycling the loads within a building on and off wherein the off time is reset by the temperature within the building. The computer 40 may be a Honeywell 316 minicomputer or a National Semiconductor IMP 16 micropressor. In the memory 50 of the computer, certain storage locations, such as block 51, are set aside for the duty cycle control schedule shown in FIG. 3.

The numbers at the top of the schedule designate Bit locations and the numbers to the left of the schedule designate Words of storage. In Word 0 of the schedule, Bit 15 is used to designate whether the schedule is an active or inactive schedule. If the schedule is an inactive schedule, the computer program will ignore this schedule and not use it in conjunction with the program in controlling the loads. Bits 12–14 in Word 0 are used to designate whether the schedule is a one day schedule, a three day schedule or an eight day schedule with zero denoting a one day schedule, two denoting a three day schedule and seven denoting an eight day schedule. For simple control systems, the one day schedule denotes that all of the loads are operated according to the same time sequence or schedule for each day of the year; in a three day schedule, the loads will be operated the same Monday through Friday but differently on Saturday and still differently on Sunday and Holidays; and, an eight day schedule provides for different operations for each day of the week and holidays. Bits 8–11 designate the number of periods into which the day has been divided to a maximum of 16. Period 1 may start at 8:00 A.M., period 2 at 10:00 A.M., period 3 at 11:00 A.M. and so on. Bit 7 of Word 0 designates whether or not the first period of the time sequence for each day is a start/stop program. If A is set to 1, the program, at the beginning of the schedule or the beginning of the first period, will look at the start/stop program to determine whether a start/stop time has been designated for the beginning of this period. If there is a match, the load will be operated according to the start/stop program. If there is no match, the load will be operated according to the schedule. Throughout the day, therefore, the start/stop program will be checked to see if the load governed by the schedule is to be operated according to the start/stop program. If A is set to a 0, the schedule will govern the operation of the load.

Bits 0–6 designate the number of words in the schedule, which is used by the program to carry out the dictates of the schedule.

Bits 8–15 and 0–7 are used to provide in Word 1 two different cycle rates for cycling the loads in the building. For example, cycle rate 1 may apply to periods 1 and 2, cycle rate 2 may apply to periods 3, 4 and 5, cycle rate 1 may apply to period 6 and so on.

Words 2 and 3 are work spaces used by the program to keep track of the start times for each cycle. Word 2 is used to store the cycle rate in minutes and Word 3 is used to store the current time or point into the current cycle.

Bits 8–15 of Word 4 are used to store the next cycle time, i.e., the time at which the next cycle will begin. For example, if the cycle rate is 30 minutes in a given period beginning at 8:00 o'clock, the time 8:00 o'clock is first entered into Bits 8–15. At 8:30, the time 8:30 is next entered into Bits 8–15. This provides an easy mechanism for the program to keep track of the time at which the next cycle is to begin. Bits 3–7 are open. Bit 2 is used by the program to determine whether or not it is time for new action. Bits 0 and 1 are used to denote the present type of action or control for a point or load assigned to the schedule. If these bits denote a zero, the load is to be held off during a given period; if they denote a 1, the load is to be held on during the period; if the bits denote a 2, the load is to be cycled at cycle rate 1; and, if the bits denote a 3, the load is to be cycled at cycle rate 2.

Words 5 and 6 are used to split up the day into a plurality of time periods. The bits in Words 5 and 6 denote the type of action to be taken during a period and use the same designations as Bits 0 and 1 of Word 4. Specifically, if these bits are a 0, they denote that the load should be controlled off during the period. If these bits denote a 1, the load should be turned on. If these bits denote a 2, the load should be cycled at cycle rate 1, and, if these bits denote a 3, this load should be cycled at cycle rate 2. If the program is currently in period 4, the bits stored in Bits 8 and 9 of Word 5 are put into the control bits 0 and 1 of Word 4. This operation allows easy access by the program to determine the type of action to be taken during any particular period and for a particular load, i.e., to save the program time of digging through the schedule to look at the particulr period in Words 5 and 6 in which the program is now operating.

Words 7-14 are used to denote the start times for each period. For example, the first period, as determined by Bits 8-15 of Word 7, may have a start time of 8:00 A.M. and the second period, contained in Bits 0-7 of Word 7, may have a start tim of 10:00 A.M. For start time period one, Bits 14 and 15 of Word 5 may denote that the load should be operated at cycle rate 1. Thus, during the time from 8:00 A.M. to 10:00 A.M., this load will be operated at cycle rate 1. The beginning of the second period starts at 10:00 A.M. and Bits 12 and 13 of Word 5 denote the type of action to be taken for this load during this second time period. These bits may indicate that the load should be operated continuously on during this time period. Bits 8-15 of Word 8 denote the start of the third period which also signals the termination of the second period. Bits 10 and 11 of word 5 denote the type of operation to be taken during the third period and so on. Each day may have up to 16 periods as shown in FIG. 3. The next day, if the schedule is more than a one day schedule, will begin at Word 15 if 16 periods are used for day zero. If Bits 12-14 of Word 0 denote that the schedule is a one day schedule, then only day zero will be included in this schedule. If Bits 12-14 indicate that the schedule is a three day schedule, then there will be three days such as day zero provided in the schedule and, if the schedule is an eight day schedule, there will be eight such days as day zero in the schedule all perhaps with different periods and different start times.

The schedule of FIG. 3 pertains to all of the loads assigned to it whereas the table of FIG. 4, which may be stored in memory 50 in block 52, includes some general information as to each of the points or loads contained in the table and then specific information to each point.

In FIG. 4, Words 0-4 pertain to all of the points included in the table shown in that figure. Bit 15 of Word 0 indicates whether or not the table shown is an enabled table, that is, whether the table will be used by the program to control the loads. Bit 14 is open. Bits 7-13 indicate the point within the table which is waiting to be controlled by the program. Bits 0-6 of Word 0 indicate the number of points assigned to that table and aids the program in keeping track of where it happens to be in the table.

Bits 6-15 of Word 1 labelled CALCULATION GROUP indicates the assumed kilowatt minutes which are saved if the program proceeds according to the schedule. Bits 1-5 are open and Bit 0 is a duty cycle override flag which is settable according to peak demand and is used by the program to override the duty cycle program when there is a danger of exceeding the peak load limit established by the power companies such that if this limit is exceeded the owner of the building will be charged a higher rate for the electrical energy used. The peak demand program as well as the start/stop program are not disclosed herein since they are not necessary to an understanding nor the utilization and operation of the invention but are discussed only for purposes of explantion.

Bits 1-15 of Word 2 indicate the outside air temperature sensor point to which the points of the table are assigned. The outside air temperature is used, for example, to determine whether the program should be in winter or summer operation. Bit 0 is blank.

Bits 14 and 15 of Word 3 are blank. Bits 7-13 indicate the maximum space temperature assigned to the points of the table and Bits 0-6 indicate the minimum space temperature assigned to these points. The maximum and minimum space temperatures establish a space temperature range which is used by the program.

Bits 7-15 of Word 4 are open and Bits 0-6 are used to indicate the changeover temperature which is compared with the outdoor temperature to operate the loads in either winter or summer control.

Words 5-9 of the table contain information relating to the operational characteristics of the particular point or load assigned to these words. Bits 6-15 of Word 5 provide the channel and group address of the load. The computer may have, for example, a plurality of output lines each line designated a channel. Connected to any channel can be a group or a plurality of groups of loads which are designated herein as points. In order for the computer to communicate with a point within a group on a channel, the computer must known the channel and group address of that point. Bits 1-5 of Word 5 indicate the point address for the specific load covered by Words 5-9 of this table. Bit 0 of Word 5 denotes whether or not this load is an interior zone. If B is a 1, the point is an interior zone and if B is a 0 this point is an exterior zone.

Bits 6-15 of Word 6 indicates the channel and group address of the space temperature sensor to which this point or load is assigned. Bits 1-5 of Word 6 indicate the point address of this word. Bit 0 indicates whether the off time during the cycle for the load shall be a zero or a minimum value if the space temperature as detected by the space temperature sensor assigned to this point is out of the comfort range or the range established by the maximum and minimum space temperatures. If C is a 1, the off time is set to 0; and, if C is a 0, the off time is set to its minimum off time.

Bit 15 of Word 7 is used to indicate a start command and Bit 14 is used to indicate a stop command. Bits 7-13 are used to indicate the maximum off time for the load or point and Bits 0-6 are used to store the minimum off time for the load.

Bits 6-15 of Word 8 indicate the kilowatt rating of the load which is used to determine the kilowatt savings as the load is being operated. Bits 0-5 of Word 8 designate the particular schedule, such as the schedule shown in FIG. 3, to which this particular point is assigned.

Bits 6-15 of Word 9 are used by the program to store the number of minutes remaining for energization of the load, i.e. this amount of time indicates when the load will be turned off. The message stored in these bits is counted down or in actuality is counted up from a minus number to 0 at which time the load will be turned off. Bits 0-5 of Word 9 indicate the amount of time which the load is to remain off.

Words 10-14 have information in them similar to Words 5-9. Words 10-14 indicate the second point covered by the table of FIG. 4. There may be, for example, up to 99 points covered in this table with words 0-4 applicable to all such points.

Figure 5A:
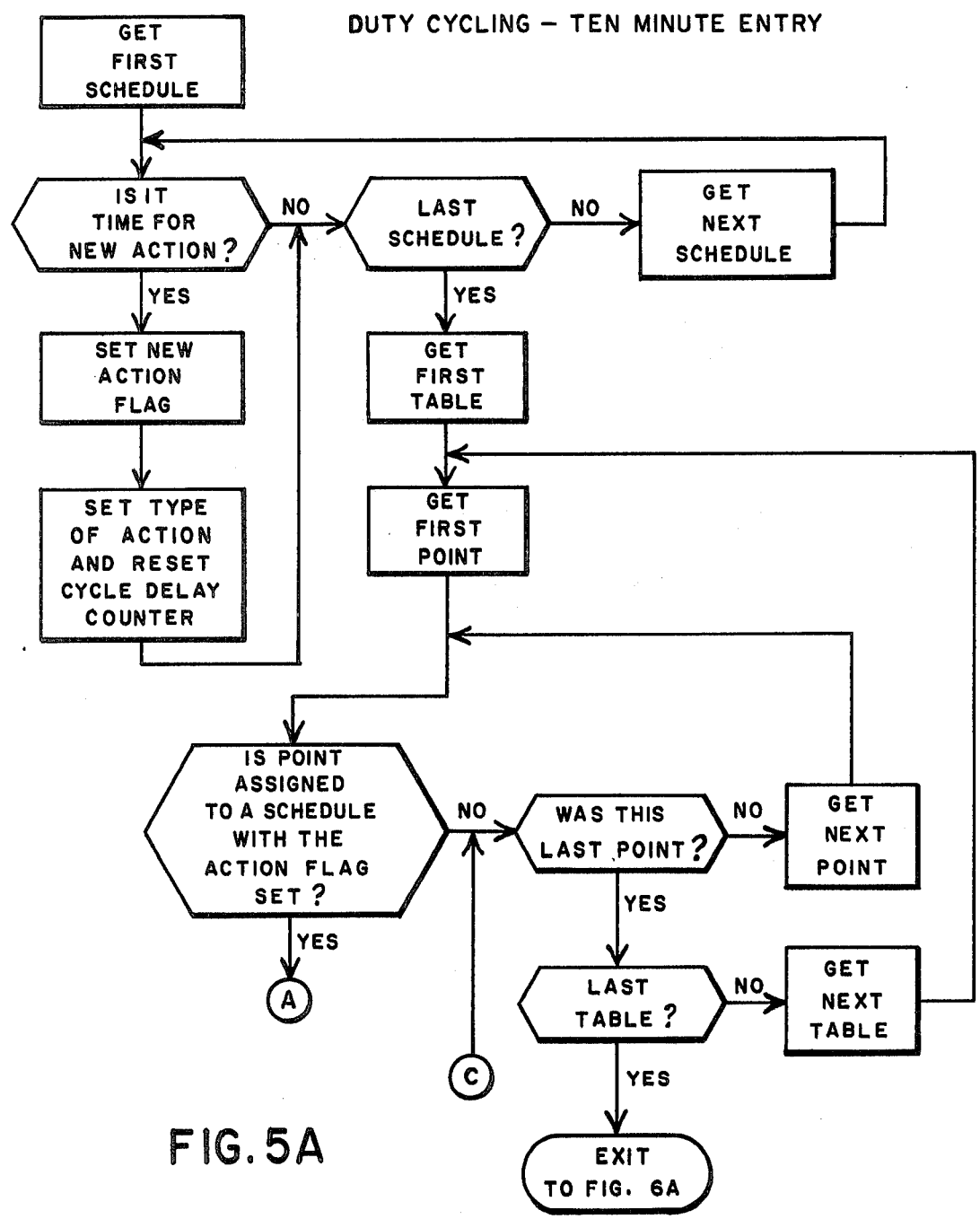
FIGS. 5A-5C show, in flow chart form, the ten minute entry portion of the program used with the computer shown in FIG. 2; and, FIGS. 6A and 6B show, in flow chart form, the one minute entry portion of the program which is used by the computer shown in FIG. 2 for cycling the loads within a building.
Figure 5B:
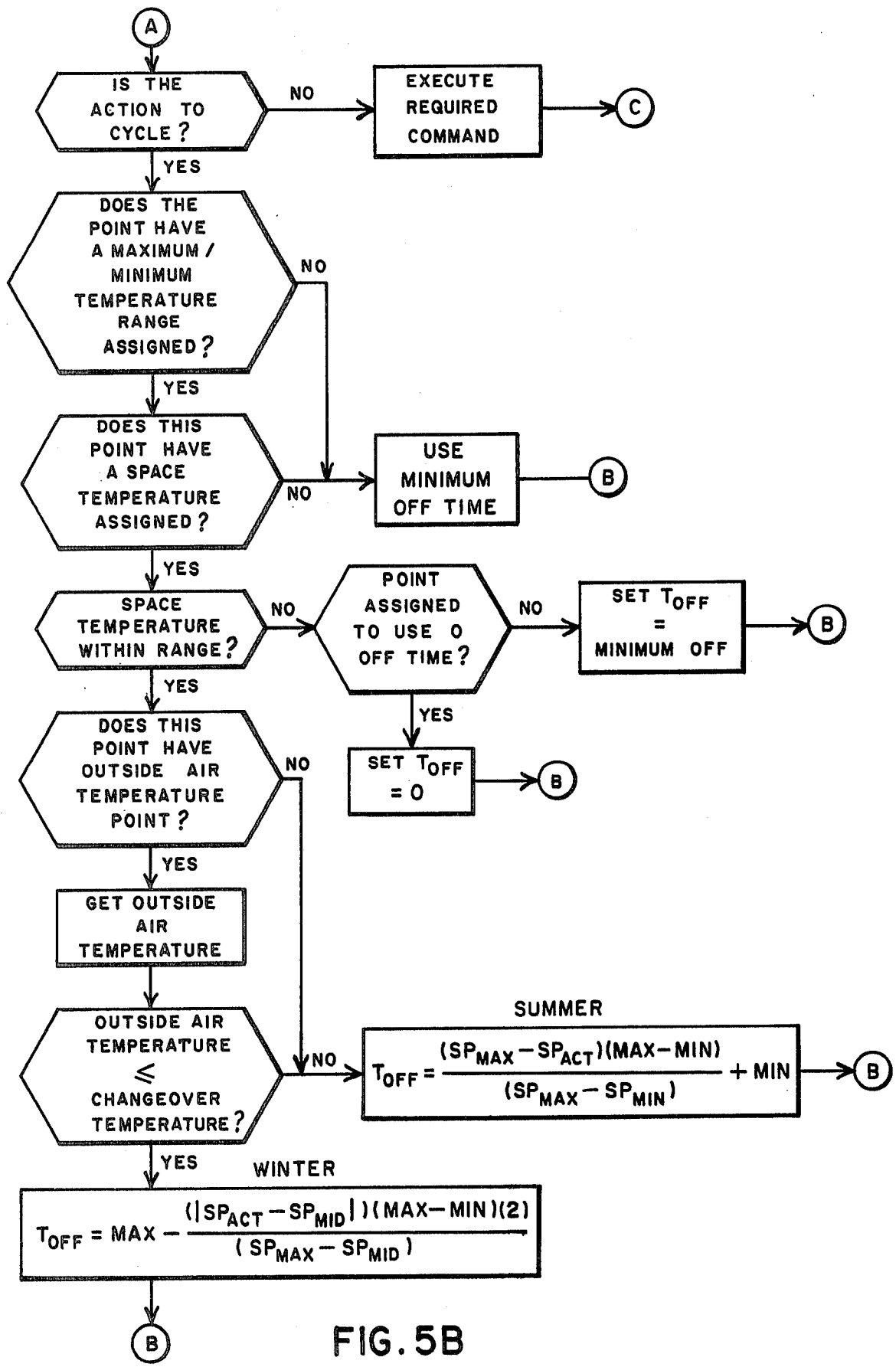
Figure 5C:
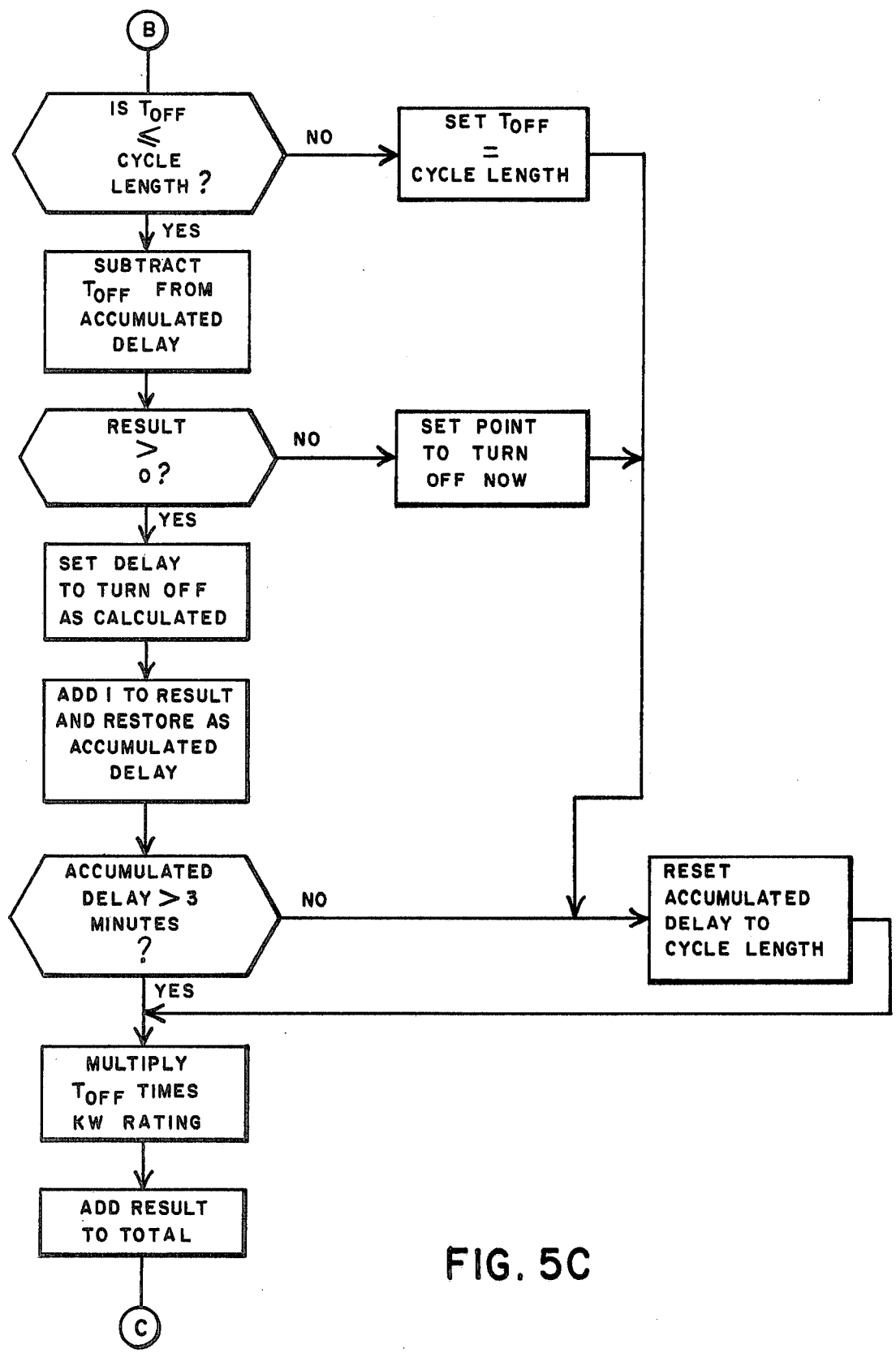

FIGS. 5A-5C show the flow chart of the 10 minute entry portion of the program of the appendix attached hereto. Generally, the 10 minute entry program inserts the proper messages into the schedules and tables storage locations and then the 1 minute entry program shown in FIGS. 6A and 6B utilize this information to control the loads according to the program.

The operation of the appended program is shown in FIGS. 5A-5C, 6A and 6B. In FIG. 5A the program first gets the first schedule and then determines whether it is time for new action by comparing the real or actual time to the start time of each period in the schedule. If it is time for new action, for example if it is time to energize a load according to a new period as shown in the schedule, the new action flag B, Bit 2 of Word 4, in the schedule is set. After the new action flag is set, the program next takes the period bits in Words 5 and 6 (schedule of FIG. 3) of the specific period in which the program is about to enter and enters these bits into bit locations 0 and 1 of Word 4 in the schedule, and the program also will reset the cycle delay counter by storing the cycle rate for that period, if the load during that period is to be operated during a cycle rate mode, into both work spaces, Words 2 and 3 of the schedule. After this is accomplished, or if it is not time for new action, the program checks to see if this schedule is the last schedule to be looked at. There may be a plurality of schedules and the program will have to perform this operation on each to determine whether it is time for new action and, if so, to set the new action flag. If this schedule is not the last schedule, then the next schedule is obtained and again it is determined whether it is not time for new action and, if it is, the new action flag is reset, the type of action is set and the cycle delay counter is reset. All of the schedules are operated on in this manner until the last schedule. When the last schedule has been operated on, the first table is obtained and then the first point out of that table is obtained.

The program next determines whether or not that point just obtained is assigned to a schedule which has had its action flag set. If the action flag has been set, the program next proceeds to point A of FIG. 5B where it determines whether the action is to cycle; thus, the program looks at Bits 0 and 1 in Word 4 of the schedule to determine the type of operation which the load is to undertake. If the action is not to cycle, that is Bits 0 and 1 in Word 4 of the schedule indicate that the load is to be operated either off or on continuously, the program executes the required command by turning the load on or off and proceeds to point C. If the action is to cycle, the program next determines whether or not the program has a maximum/minimum temperature range assigned to it by looking at Word 3 in the duty cycle table. If this point does not have the maximum/minimum temperature range assigned to it, the program is instructed to use the minimum off time by inserting into Bits 0-5 of Word 9 of the table the minimum off time contained in Bits 0-6 of Word 7 of that table. The program then proceeds to point B whereat generally the amount of remaining on time is determined and the kilowatt savings is computated which will be discussed more specifically hereinafter. If this point does have a temperature range, the program next determines whether this point has a space temperature sensor or point assigned to it. If not, Bits 0-5 of Word 9 of the table is set to the minimum off time for that point, and the program then proceeds to point B of the flow chart in FIG. 5C. If there is a space temperature sensor or point assigned to this load or point, the program next determines whether or not the space temperature assigned to this point is within the maximum/minimum temperature range.

If not and if the point is assigned to use 0 off time as determined by Bit 0 of Word 6 in the table, Bits 0-5 of Word 9 of the table are set to 0 and the program proceeds to point B. If the space temperature is not within the range and if the point is not assigned to use 0 off time, the program then sets Bits 0-5 of Word 9 of the table to be the minimum off time as shown in Bits 0-6 of Word 7 of the table and proceeds to point B. This operation assures that, if the space temperature is not within the maximum/minimum temperature range assigned to that point, the load for that point will not be turned off more than either the 0 time set for it or the minimum time set for it so that the temperature at that point will fall back into this space temperature range.

If the space temperature is within the maximum/minimum temperature range, however, the program next determines whether this point has an outside air temperature point or sensor assigned to it. If not, then the off time is determined by the summer algorithm shown in FIG. 5B, but if it does have an outside temperature point assigned to it then the program next gets that outside air temperature as measured by this sensor and determines whether or not the outside air temperature is less than or equal to the change-over temperature which changeover temperature is included in the memory in Bits 0-6 of Word 4 of the table. The outside air temperature point assigned to this point is shown in Bits 1-15 of Word 2 of the table and the outside air temperature and changeover temperature are compared to determine whether the system should be operating in winter or summer operation. If the point is assigned to an interior zone as determined by flag B in Bit 0 of Word 5 of the table, then it is in a summer operation at all times and the summer algorithm will be performed. If the outside air temperature is not lower than the changeover temperature, the summer algorithm will be performed. The off time for the summer operation is calculated according to the formula shown in FIG. 5B. The actual space temperature is substracted from the maximum space temperature assigned to that point as shown in Bits 7-13 of Word 3 and the result is multiplied by the difference between maximum and minimum off times assigned to that point as shown in Bits 0-13 of Word 7 of the table. The result is then divided by the difference between the maximum space temperature and the minimum space temperatures assigned to this point as shown in Bits 0-13 of Word 3 of the table and then this result is added to the minimum off time. This off time is stored in Bits 0-5 of Word 9 and the program proceeds to point B. If the outside air temperature is less than the changeover temperature, then the system is in winter control and the winter algorithm will be performed according to the formula shown in FIG. 5B. The absolute value of the difference between the actual space temperature and the mid-point temperature of the maximum/minimum temperature range is multiplied by the difference between the maximum and minimum off times assigned to this point. This result is divided by the difference between the maximum space temperature assigned to this point and the mid-point space temperature of the maximum/minimum temperature range. This result is then substracted from the maximum off time to determine the off time for the point which is then entered into Bits 0–5 of Word 9 of the table for this point. The program next proceeds to point B.

At point B, if the off time as stored in Bits 0-5 of Word 9 of the table is not less than the cycle length which is determined by the cycle rate to which this point is presently assigned, then the off time is set to the cycle length, by storing the cycle length in Bits 0–5 of Word 9 in the table, since it would be impossible to keep the load or point off longer than the cycle length. Then the accumulated delay is reset to the cycle length by making work space Word 3 of the schedule the same as work space Word 2, work space Word 2 denoting the cycle length. If the off time is less than the cycle length, however, the off time as stored in Bits 0–5 of Word 9 of the table is subtracted from the accumulated delay which has been stored in Word 3 of the schedule. The accumulated delay stored in word 3 of the schedule indicates where this particular point is in its current cycle.

After the off time has been subtracted from the accumulated delay stored in Word 3 of the schedule, the program determines whether this result is greater than 0. If not, this indicates that the load should be turned off and, therefore, the point is set to turn off immediately and then the accumulated delay is reset to the cycle length which is effect makes Word 3 of the schedule the same as Word 2 for the next point. If the result is greater than 0, however, then Bits 0–5 of Word 9 are set to the off time as previously calculated and then 1 is added to the resulting accumulated delay and it is restored in Word 3 of the schedule. This operation insures that as each point is operated on by the program as indicated above, the loads will not all be on and off at the same time but rather their operation will be distributed over the period for that schedule. This does not insure that this distribution is evenly distributed but only that these loads will not be off at the same time.

The program next determines whether the accumulated delay stored in Word 3 of the schedule is greater than 3 minutes. If not, Word 3 is reset to the cycle length. If the accumulated delay is greater than 3 minutes, or if not and after the accumulated delay has been set to the cycle length, the program next multiplies the off time for that point by the kilowatt rating for that point as stored in Bits 6–15 of Word 8 and adds this result to its total which can be then used as a print-out later or to show the expected kilowatt savings of this cycling program, and the program proceeds to point C.

At point C of FIG. 5A the program then determines whether this was the last point. If not, the next point is obtained and this entire operation is performed again. If it was the last point, the program determines whether this table was the last table. If not, the next table is obtained and this operation is then performed for all the points in that table. When the last table is operated on, the program exits to the 1 minute entry program shown by the flow chart in FIGS. 6A and 6B. The 1 minute entry program is then designed to operate the loads in accordance with the information and calculations stored in the duty cycle schedule and the duty cycle table. In this manner, each load is checked each minute to determine whether any action needs to be taken.

Figure 6A:
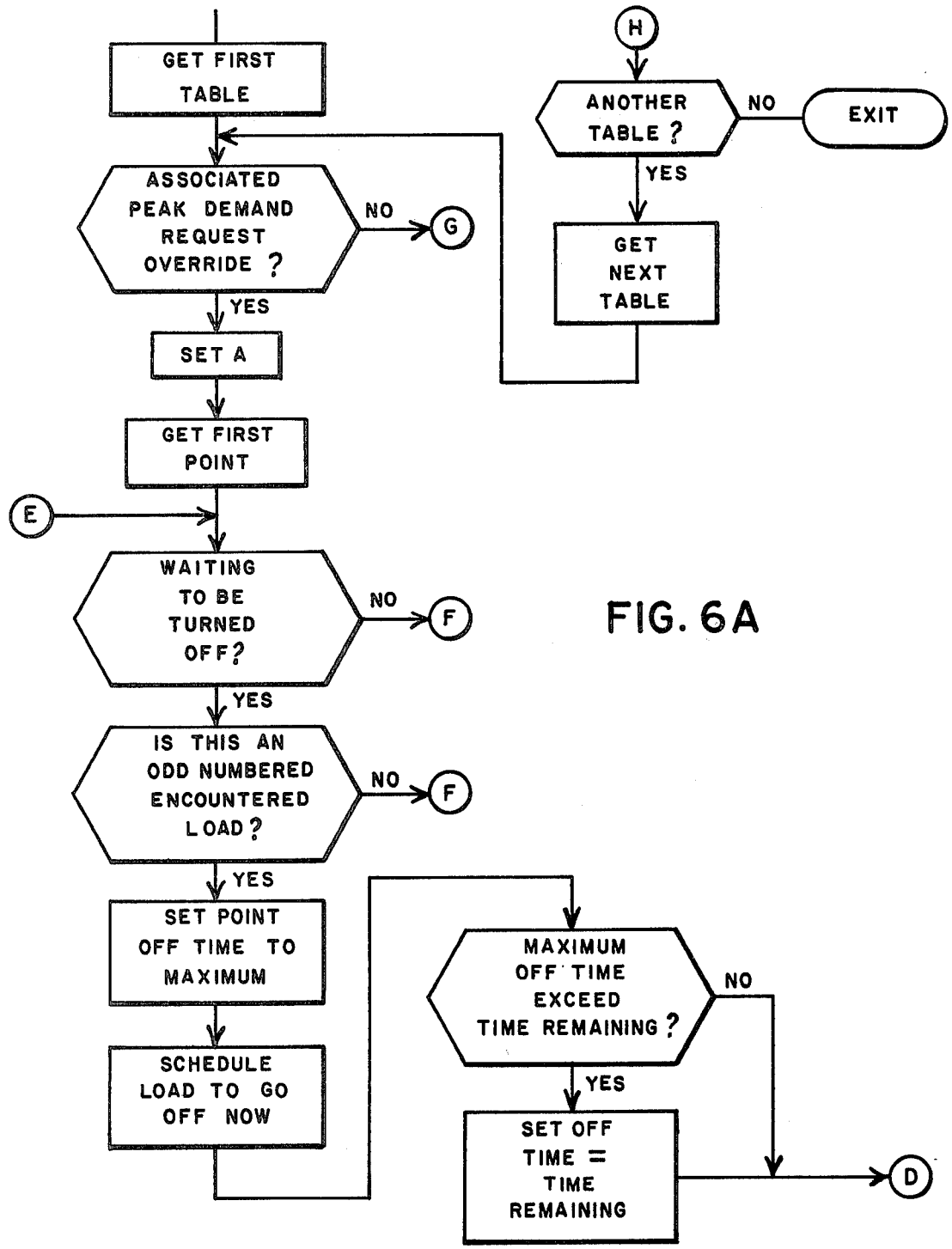

At the beginning of the 1 minute entry program as shown in FIG. 6A, the program first gets the first table and checks to see whether or not an associated peak demand request override is present by looking at the peak demand program to determine whether or not an override is indicated. If not, the program proceeds to point G where it will appropriately control the load. If there is an override indicated by the peak demand program, the A flag which is Bit 0 in Word 1 of the duty cycle table of FIG. 4 is set to a 1 and the first point is obtained.

If the peak demand program has determined that the energy used by the building is exceeding the peak demand limit established by the power companies, the program also determines that certain loads should be shed to bring the consumed energy down below the peak demand limit. Thus the A flag is set. The program is not shown herein since it is not necessary for the duty cycle operation according to the instant invention and these steps may be eliminated. They are included for explanation purposes only, however, to show how a duty cycle program can be interfaced with a peak demand program.

Once the first point has been obtained, the program next checks to see if this point or load is waiting to be turned off. The countdown to turn off portions of Word 9 of the duty cycle table indicates how much time remains for energization of the load. If this word indicates that the load is already off, the program proceeds to point F where the program checks to see if this was the last point and if not it gets the next point. However, if the load has not been turned off, the program next checks to see if this is an odd numbered encountered load. The purpose of this operation is to turn off 50% of the loads each time the program checks these points or loads until the energy usage of the building has been brought down below the peak demand limit. Thus, odd numbered loads are turned off and even numbered loads proceed to point F. If this is an odd numbered encountered load, then the minutes to be off portion of Word 9 of the table is set to the maximum off time as established by the appropriate portion of Word 7 of the table. The program then schedules the load to go off now by inserting a 1 into bit S2 of Word 7 of the table to indicate that the next message for that point should be a stop command. The program next determines whether the maximum off time exceeds the time remaining for this point by checking the minutes to be off portion against the countdown to turn off portion of Word 9. If not, the program proceeds to point D and if it does the minutes to be off portion of Word 9 is set to the time remaining as shown in the countdown to turn off portion of Word 9 which will have the effect of turning off the load and then the program again proceeds to point D.

Figure 6B:
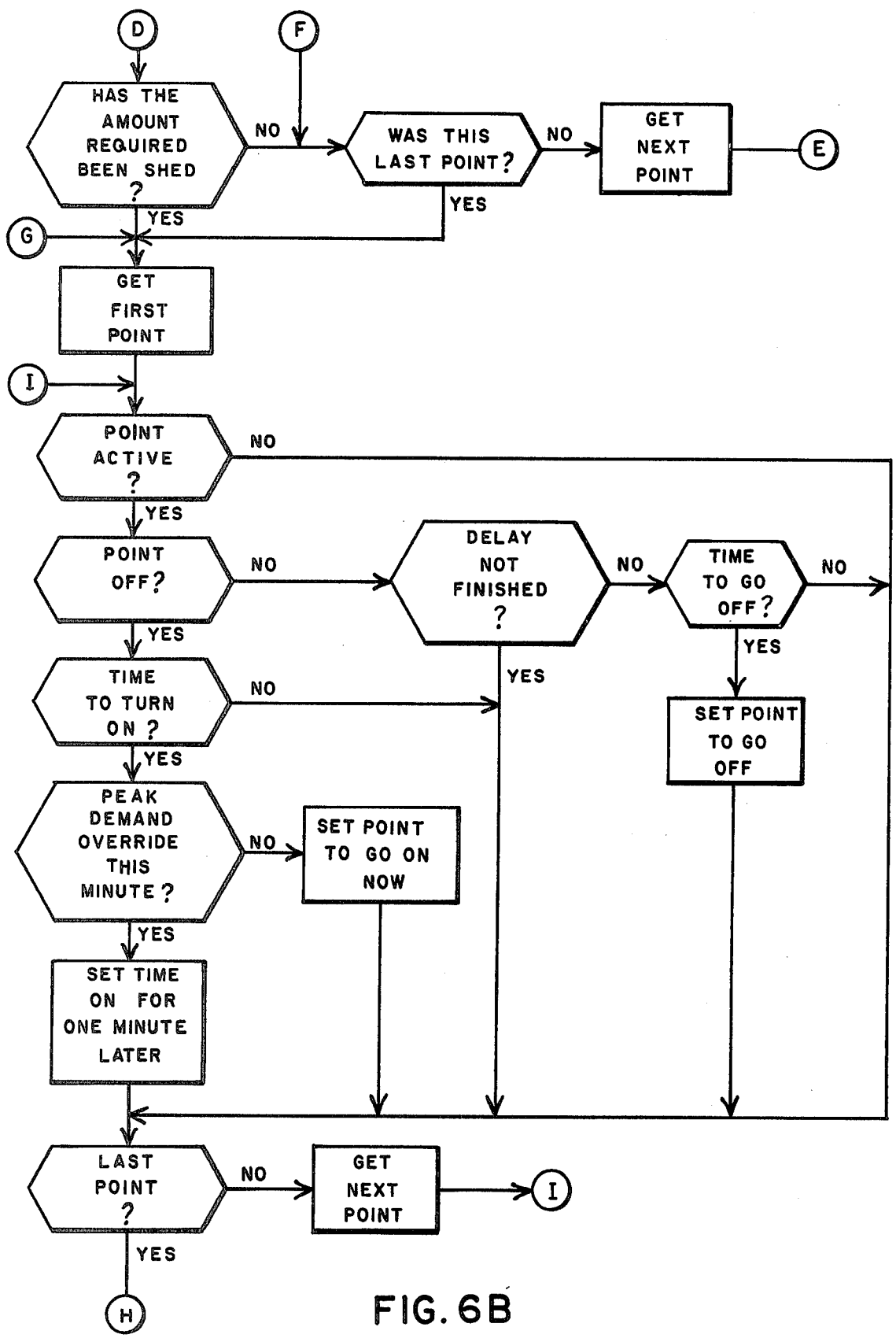

The program at point D determines whether the required amount or number of loads has been shed in order to reduce the energy usage below the peak demand limit. If not and more loads have to be shed, or, referring to FIG. 6A, if this particular point had not been waiting to be turned off or if it was not an odd number encountered load, the program determines whether this was the last point and, if not, it gets the next point and returns at point E to the portion of the program as indicated in the flow chart of FIG. 6A. This operation is repeated for each point until all of the points have been investigated or the amount or number of loads required have been shed. Once this operation is complete or if there was no associated peak demand request override as indicated in FIG. 6A, the program gets the first point and determines whether the point is active which is merely a system check to make sure that a load has been in fact designated to that point. If there is actually no load for that point or no point actually exists, the program then checks to see whether this was the last point and, if not, it gets the next point and returns to point I of the program. If this point is active, the program determines whether the point is off. If the point is not off, the program checks to see whether the delay is finished by checking Bits 6–15 of Word 9 of the table. If the delay is not finished, the program proceeds to check to see if this point is the last point. If the delay is finished, the program checks to see whether it is time for the point or load to go off by adding 1 minute to the countdown to turn off portion of Word 9. If it is not time to go off, the program proceeds to check to see whether this point is the last point, but if it is time to got off the program sets this point to go off by inserting a 1 into Bit 14 of Word 7 and then checks to see whether this is the last point. If this point was off, the program next checks to determine whether it it should go on by comparing the actual time to the next cycle time as stored in Word 4 of the duty cycle control schedule. If it is not time to turn on this load or point, the program checks to see whether this is the last point. If it is time to turn the load on, the program determines whether there has been a peak demand override this minute. If not, the point is set to go on now by inserting a 1 into Bit 15 of Word 7 of the duty cycle table, but if there is a peak demand override this minute the time on for this point is set to be 1 minute later to delay the turn on of the load to see if the energy usage of the building has subsequently decreased below the peak demand limit established for that building. This point is then checked to see if it is the last point of the table. If not, the next point is obtained and the point proceeds to point I as shown in FIG. 6B, but if it is the last point in this table, the program proceeds to point H in FIG. 6A to determine whether there is another table. If not, the program exits and waits for the next minute to begin the one minute entry duty cycle again but if it was not the last table, the next table is obtained and it is checked point by point in the same manner. At the end of 10 minutes, the ten minute entry program of FIGS. 6A–6C is performed again after which the one minute program is executed.

Thus, it can be seen that a substantial energy savings can be realized by cycling the load on and off with the off time reset by the indoor or space temperature instead of operating the loads continuously as has been done in the prior art. And it is further apparent that certain modifications of the invention can be made without departing from the scope thereof and, therefore, the invention is to be limited only by the claims appended hereto.

The embodiments of the invention in which an exclusive property or night is claimed are defined as follows:

1. A system for cycling loads in a building comprising:
   physical condition responsive means adapted to be mounted internally in said building for sensing a physical condition;
   control means for cycling said loads on and off according to a predetermined cycle rate, each load having an on time and an off time within a cycle, said control means being connected to said physical condition responsive means for resetting said off time according to said physical condition; and,
   connecting means connected to said control means and adapted to be connected to said loads for cycling said loads whereby said off time of said loads are reset by said physical condition responsive means.

2. The system of claim 1 wherein said physical condition responsive means is a temperature sensor and said physical condition is temperature.

3. The system of claim 2 wherein said control means includes means for setting said off time to a minimum when said temperature is not within a predetermined range.

4. The system of claim 3 wherein said control means includes means for setting said off time to a minimum for any load not having a predetermined range of temperatures.

5. The system of claim 4 wherein said control means includes means for setting said off time to zero when said temperature is not within said predetermined range and when any of said loads are designated to have zero off time.

6. The system of claim 5 wherein said control means comprises a programmed computer.

7. The system of claim 2 wherein said control means includes means to distribute the on and off times of said loads during a period of time so that all loads are not on at the same time.

8. The system of claim 7 wherein said control means comprises a programmed computer.

9. The system of claim 1 wherein said control means comprises a programmed computer.

10. A system for cycling loads in a builing comprising:
    physical condition responsive means mounted internally within said builing for sensing a physical condition;
    control means for cycling said loads on and off according to a predetermined cycle rate, each load having an on time and an off time within a cycle, said control means being connected to said physical condition responsive means for resetting said off time according to said physical condition; and,
    connecting means connecting said control means to said loads for cycling said loads whereby said off time of said loads are reset by said physical condition responsive means.

11. The system of claim 10 wherein said physical condition responsive means is a temperature sensor and said physical condition is temperature.

12. The system of claim 11 wherein said control means includes means for setting said off time to a minimum when said temperature is not within a predetermined range.

13. The system of claim 12 wherein said control means includes means for setting said off time to a minimum for any load not having a predetermined range of temperature.

14. The system of claim 13 wherein said control means includes means for setting said off time to zero when said temperature is not within said predetermined range and when any of said loads are designated to have zero off time.

15. The system of claim 14 wherein said control means comprises a programmed computer.

16. The system of claim 11 wherein said control means includes means to distribute the on and off times of said loads during a period of time so that all loads are not on at the same time.

17. The system of claim 16 wherein said control means comprises a programmed computer.

18. The system of claim 10 wherein said control means comprises a programmed computer.

19. The method of cycling loads in a building comprising the steps of:
sensing a physical condition within said building and generating a control signal in accordance therewith;
determining the off time of said loads in accordance with said control signal;
cycling the loads on and off according to a predetermined cycle rate, each load having an on time and an off time within a cycle;
resetting said off time of said cycling step by the determined off time of said determining step.

20. The method of claim 19 wherein the step of sensing a physical condition comprises the step of sensing the space temperature within said building.

21. The method of claim 20 further comprising the steps of setting the off time for said loads to a minimum when said temperature is not within a predetermined range.

22. The method of claim 21 further comprising the step of setting the off time for said loads to a minimum for any load not having a predetermined range of temperatures.

23. The method of claim 22 further comprising the step of setting the off time for said loads to zero when said space temperature is not within said predetermined range and when any of said loads are designated to have zero off time.

24. A system for cycling loads in a building comprising:
physical condition responsive means adapted to be mounted internally in said building for sensing a physical condition;
control means for cycling said loads on and off according to a predetermined cycle rate, each load having an on-time and an off-time within a cycle, the total of said on-time and off-time for a cycle being of a predetermined length, said control means being connected to said physical condition responsive means for relatively adjusting said off-time and said on-time according to said physical condition; and,
connecting means connecting said control means adapted to be connected to said loads for cycling said loads whereby said off-time and on-time of said loads are relatively reset by said physical condition responsive means.

* * * * *